Patented Aug. 6, 1929.

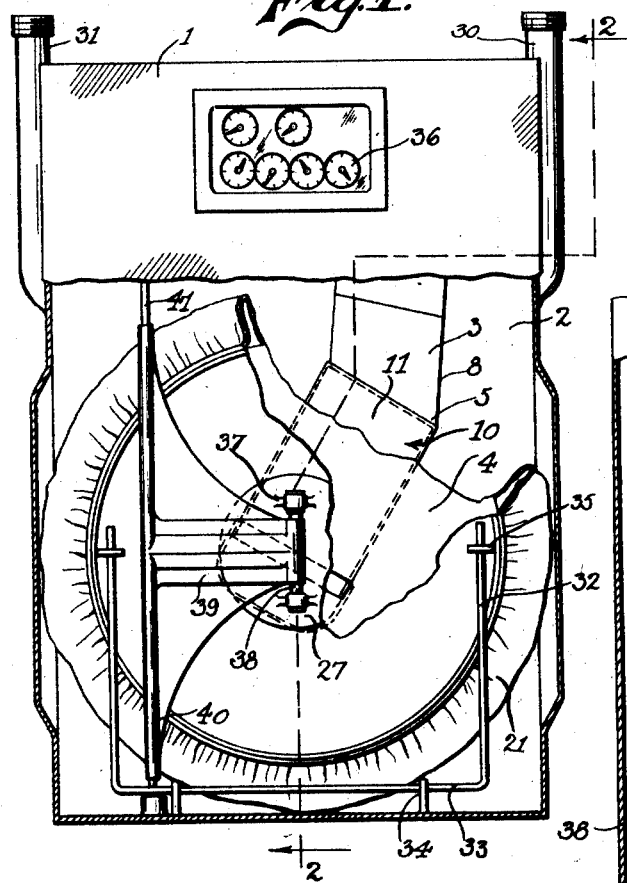

1,723,509

UNITED STATES PATENT OFFICE.

WILLIAM J. HENNING, OF EL PASO, TEXAS, ASSIGNOR TO AMERICAN METER COMPANY, INC., OF BALTIMORE, MARYLAND, A CORPORATION OF DELAWARE.

GAS-METER CONSTRUCTION.

Application filed November 16, 1927. Serial No. 233,587.

This invention relates to gas meters and particularly to a type of meter which is in common use and which involves in its construction a flexible diaphragm which forms a part of the wall of a measuring chamber. This measuring chamber is formed between two heads, one of which is moved as the chamber fills and empties itself of the gas being measured. The movement of this movable head is imparted to the dials of the meter to indicate the amount of gas that has passed through it. It is now customary to secure the edges of the flexible diaphragm to two rings, one of which is soldered to a fixed wall of the meter and the other of which is soldered to the movable head. The diaphragm is constructed of light flexible material, such as thin leather sheeting. In the soldering operation it may happen that solder will fall onto the diaphragm and burn a hole through it, or else burn it to such an extent as to impair the usefulness of the diaphragm.

Meters of this type are in very extensive use and a very considerable expense occurs annually in renewing the diaphragm, because these repairs necessitate ripping off the soldered connections for the two rings, and resoldering. These extensive soldering operations consume time and are relatively expensive.

In this type of meter the flexible diaphragm is usually formed of tanned leather and when in use the tannin in the leather sometimes reacts chemically with the iron or steel forming the heads of the measuring chamber, the result of which is that the portions of the diaphragm which are tied to the flanges become stiff to such an extent as to interfere with the free expansion and contraction of the gas measuring chamber.

The general object of this invention is to improve the general construction of meters of this type and to provide a construction for the same which will avoid the necessity for soldering the heads in the vicinity of the diaphragm; also to provide a construction which will enable meters already in use to be readily reconstructed to embody the measuring chamber of my invention in which the soldering operations cannot injure the diaphragm.

A further object of the invention is to provide a construction which will facilitate the flow of the gas into the measuring chamber with a minimum of friction.

A further object of the invention is to provide a construction at the point of attachment of the flexible diaphragm to the heads of the measuring chamber that will avoid the defect referred to above as regards the action of the tannin in the leather.

Further objects of the invention will appear hereinafter.

The invention consists in the novel parts and combination of parts to be described hereinafter, all of which contribute to produce an efficient gas meter construction.

A preferred embodiment of the invention is described in the following specification, while the broad scope of the invention is pointed out in the appended claims.

In the drawings:

Figure 1 is a view showing the upper portion of a meter in front elevation and the lower portion in vertical section with a portion of the wall of the measuring chamber broken away.

Figure 2 is a vertical section taken through this meter about on the line 2—2 of Figure 1.

Figure 3 is a perspective illustrating the inner end of a duct which I employ in constructing a meter to embody my invention; and this view shows, broken away, a small portion of the fixed head of the measuring chamber at the offset inlet which constitutes a feature of my invention and to which the duct attaches.

Figure 4 is a vertical section taken through the edge of one of the heads of the measuring chamber and illustrating the details of the construction which I employ for securing the flange to it. This view is upon an enlarged scale.

In meters of this type that are now in use, the measuring chamber, or "bellows," that measures the gas is constructed of two metal rings, one of which is soldered to the back wall of the casing of the meter, and the other of which is soldered to a movable head, the movement of which actuates the indicating dials of the meter. These rings are connected by a flexible diaphragm. When it is necessary to replace the diaphragm, it is necessary to remove these rings from the plates to which they are soldered and secure the new diaphragm to them, after which the rings are resoldered to the back wall of the meter and to the movable head of the "bellows."

I shall now describe the improvement which I employ to overcome the objections noted above. In the drawing 1 indicates a meter of the type described and having a back-plate 2. On this back-plate 2 the usual duct 3 is soldered which leads in the gas which is to be measured. This duct is usually of rectangular cross-section, and normally terminates at above the point 5 which is just within the circumference of the back ring which is soldered to the back wall of the meter. In other words, this duct 3 usually passes through the side of the ring so as to deliver the gas within the measuring chamber.

In the present instance the measuring chamber 4 comprises a fixed inner head 6 which is preferably in the form of a circular metal disk. Near the middle point of this disk an offset inlet 7 is formed. This inlet includes a transverse slot 8 (see Figure 3) formed in the plate and adjacent to this slot the metal of the head is offset from the plane of the head so as to produce a cup-form extension 9 (see Figures 2 and 3) and this cup-form inlet has its mouth disposed toward the duct 3 of the meter.

In addition to this I provide a duct 10 (see Figure 3) which is in the form of a plate 11 with integral side flanges 12. This duct is open at both ends and is closed on three sides only. At its inner end the plate 11 is cut away so as to form a throat or gap 13 (see Figure 3), the edge of which is bent to form a lip 14. In placing this duct in position its outer end is telescoped with the walls of the duct 3 and the telescoping connection 15 (see Figure 2) is soldered to make it gas tight. The lip 14 is applied to the edge 16 of the slot 8 and solder 17 is applied between the lip and the edge 16 (see Figure 2).

The ends 17ª of the side flanges 12 are telescoped with the side walls 18 of the cup-shaped extension 9 and are soldered to them to make a tight joint.

As illustrated in Figure 2, the lower portion 19 of the offset extension 9 is inclined so as to guide the inflowing gas into the chamber 4 without producing eddy currents or undue friction.

The measuring chamber has an outer or movable head 20 which is constructed of a steel or iron disk of circular form. If desired the disks 6 and 20 may be tinned. They are connected by flexible diaphragm 21 of light tanned leather. In order to secure the diaphragm to the disk, each disk is provided with a flange 22. These flanges are constructed of a metal which is unaffected by the tannin in the leather. For this purpose I prefer to employ seamless rings of aluminum. The edges of these rings are rolled into the edges of the disks to form a seam 23 (see Figure 4). If desired a gasket 24 of suitable compressible material may be rolled into this seam to render it gas tight.

The ends of the diaphragm are slipped over the flanges and secured to them by wrappings 25 of cord or catgut.

The movable head 20 is preferably formed with a circular opening 26 which is located opposite to the slot 8 in the fixed head. In the construction of the meter the opening 26 is left open so as to give access to the slot 8 to enable the solder to be applied to secure the fixed head 6 to the end of the duct 10. After this connection has been soldered the opening 26 should be closed by the application of a cover-plate 27.

The opening 26 is preferably formed with a flange 28, and the cover-plate is provided with a similar flange 29 to telescope over it. At this point solder may be applied to secure the cover-plate to the movable head and to make a gas tight connection.

In the operation of the meter the gas measuring chamber 4 which is formed between the diaphragm 21 and the two heads 6 and 20, expands and collapses alternately. At each expanding movement it fills with gas that flows in through the inlet connection 31, and at each contracting movement this gas flows out through the outlet connection 30 of the meter. In this way the gas that passes through the meter is measured. The movable head 20 is guided in the usual manner by means of a light wire guide frame 32 (see Figure 1) that has a shaft portion 33 pivotally mounted in brackets 34 on the bottom wall of the meter casing. The arms of this frame slide freely through guide brackets 35 on the outer side of the movable head 20.

The cover-plate 27 carries a connection of proper design to enable it to operate the indicating dials 36 of the meter (see Figure 1). This connection consists of a bracket having two legs, or posts, 37, secured to the outer side of the cover-plate, and these brackets support a wrist-pin 38 mounted at the end of an arm 39 of plate form which is provided at its wide end with a sleeve 40 rigidly attached to a rock-shaft 41. This rock-shaft 41 extends up into the upper portion of the meter where it is connected with mechanism (not illustrated) for driving the indicating dials 36 and for actuating the valve or valves that control the flow of gas through the meter.

It is understood that the embodiment of the invention described herein is only one of the many embodiments this invention may take, and I do not wish to be limited in the practice of the invention, nor in the claims, to the particular embodiment set forth.

What I claim is:

1. In a gas meter, the combination of a casing having a wall with a duct on the side thereof for admitting the gas to be measured, a measuring chamber having a fixed head adjacent to the said wall and having an offset inlet offset from the plane of the head toward the said wall, and a duct connecting with the first named duct lying between the said wall and the said fixed head and connected to the said offset inlet.

2. In a gas meter, the combination of a casing having a wall with a duct on the side thereof for admitting the gas to be measured, a measuring chamber having a fixed head adjacent to the said wall and having an offset inlet offset from the plane of the head toward the said wall, and a duct open at both ends lying between the said wall and the fixed head, telescoping at one end with said first named duct and secured thereto, and telescoping at its other end with the said offset inlet and secured thereto.

3. In a gas meter, the combination of a casing having a wall with a substantially rectangular duct on its inner side for admitting the gas to be measured, a measuring chamber having a fixed head adjacent to the said wall and having a cup-form offset inlet struck from the material of said head and lying adjacent the said wall with its mouth opening toward the first named duct, and another duct consisting of a plate lying adjacent to the said fixed head with side flanges having their edges secured against the said wall and with the ends of said last named duct secured to the first named duct and to the said offset inlet.

4. In a gas meter, the combination of a casing having a wall with a duct on the inner side thereof for admitting the gas to be measured, a measuring chamber having a fixed head adjacent to the said wall with a transverse slot formed in the head, the material of said head on the side of said slot remote from said duct being offset toward the said wall and co-operating with the slot to form an offset inlet for the measuring chamber, and another duct connected with the first-named duct, and consisting of a plate secured against the outer side of the said head with a lip engaging the edge of said slot and soldered thereto, said plate having integral flanges secured against the inner face of the said wall, said last named duct connecting at its inner end with the offset portion of the offset inlet.

Signed at El Paso, Texas, this 7th day of November 1927.

WILLIAM J. HENNING.